(12) United States Patent
Shenoy et al.

(10) Patent No.: US 8,279,863 B2
(45) Date of Patent: Oct. 2, 2012

(54) METHODS AND APPARATUS FOR DYNAMIC DETECTION OF TRANSIT TIMES BETWEEN STAGES IN DISTRIBUTED MULTI-STAGE SWITCH FABRICS

(75) Inventors: Sathish Shenoy, San Jose, CA (US);
Anurag Agrawal, Santa Clara, CA (US);
Philip A. Thomas, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 641 days.

(21) Appl. No.: 12/494,780

(22) Filed: Jun. 30, 2009

(65) Prior Publication Data

US 2010/0329249 A1 Dec. 30, 2010

(51) Int. Cl.
*H04L 12/50* (2006.01)
*H04Q 11/00* (2006.01)
(52) U.S. Cl. ........................................ 370/388; 370/389
(58) Field of Classification Search .......... 370/386–391, 370/372, 380, 412–420
See application file for complete search history.

(56) References Cited

U.S. PATENT DOCUMENTS

| | | | |
|---|---|---|---|
| 4,722,603 A | | 2/1988 | Graebner et al. |
| 5,361,255 A | * | 11/1994 | Diaz et al. ........................ 370/374 |
| 5,796,795 A | | 8/1998 | Mussman et al. |
| 6,301,269 B1 | | 10/2001 | Tayloe et al. |
| 6,614,236 B1 | | 9/2003 | Karam |
| 6,850,704 B1 | | 2/2005 | Dave |
| 6,982,974 B1 | * | 1/2006 | Saleh et al. ..................... 370/386 |
| 6,993,032 B1 | * | 1/2006 | Dammann et al. ........ 370/395.7 |
| 7,190,667 B2 | * | 3/2007 | Susnow et al. ................. 370/229 |
| 7,505,458 B2 | | 3/2009 | Menon et al. |
| 2002/0080823 A1 | | 6/2002 | Wolf et al. |
| 2002/0159385 A1 | * | 10/2002 | Susnow et al. ................. 370/229 |
| 2004/0037277 A1 | * | 2/2004 | Mathews et al. ................ 370/386 |
| 2009/0028229 A1 | | 1/2009 | Cagno et al. |
| 2010/0165984 A1 | * | 7/2010 | Aybay et al. ................... 370/388 |
| 2011/0096781 A1 | * | 4/2011 | Aybay ............................ 370/392 |

OTHER PUBLICATIONS

Search Report for European Application No. 10165267.5, mailed Aug. 24, 2010 (7 pages).

* cited by examiner

*Primary Examiner* — Chuong T Ho
(74) *Attorney, Agent, or Firm* — Cooley LLP

(57) ABSTRACT

In some embodiments, a method includes sending a signal to a first module associated with a stage of a switch fabric and receiving a signal from the first module a first amount of time after sending the signal to the first module. A signal is sent to a second module associated with the stage of the switch fabric and a signal is received from the second module a second amount of time after sending the signal to the second module. The second amount of time is less than the first amount of time. A cell of a first data packet is sent to the first module and a cell of a second data packet is sent to the second module a third amount of time after sending the cell of the first data packet. The third amount of time is associated with the difference between the first amount of time and the second amount of time.

20 Claims, 5 Drawing Sheets

METHODS AND APPARATUS FOR DYNAMIC DETECTION OF TRANSIT TIMES BETWEEN STAGES IN DISTRIBUTED MULTI-STAGE SWITCH FABRICS

BACKGROUND

Embodiments described herein relate generally to switch fabrics and more particularly, for example, to the synchronization of distributed switch fabrics such as Clos networks.

Clos networks are multi-stage switch networks that provide non-blocking connections between multiple input ports and multiple output ports. A non-blocking network is a network in which a data path through the network can always be established between an idle input port and an idle output port.

A three-stage Clos network, for example, has a middle stage connected between an input stage and an output stage. Each stage includes multiple modules. Each input stage module has multiple input ports and is operatively coupled to each middle stage module. Similarly, each output stage module has multiple output ports and is connected to each middle stage module.

A switch fabric having input stage modules with a large number of input ports, output stage modules with a large number of output ports and/or a large number of modules within each stage, has many connections. Thus, a large number of cables can be used to connect the modules within the switch fabric. If the cables have varying lengths, the amount of time a cell takes to pass through the switch fabric can vary. This can cause an output port to receive cells from the switch fabric in an incorrect order.

Thus, a need exists for an apparatus and method to automatically determine and compensate for the amount of time a cell takes to pass between modules associated with stages of the switch fabric. Additionally, a need exists for an apparatus and method to ensure that an output port of a switch fabric receives cells from the switch fabric in a correct order.

SUMMARY

In some embodiments, a method includes sending a signal to a first module associated with a stage of a switch fabric and receiving a signal from the first module a first amount of time after sending the signal to the first module. A signal is sent to a second module associated with the stage of the switch fabric and a signal is received from the second module a second amount of time after sending the signal to the second module. The second amount of time is less than the first amount of time. A cell of a first data packet is sent to the first module and a cell of a second data packet is sent to the second module a third amount of time after sending the cell of the first data packet. The third amount of time is associated with the difference between the first amount of time and the second amount of time.

DETAILED DESCRIPTION

Figure 1:
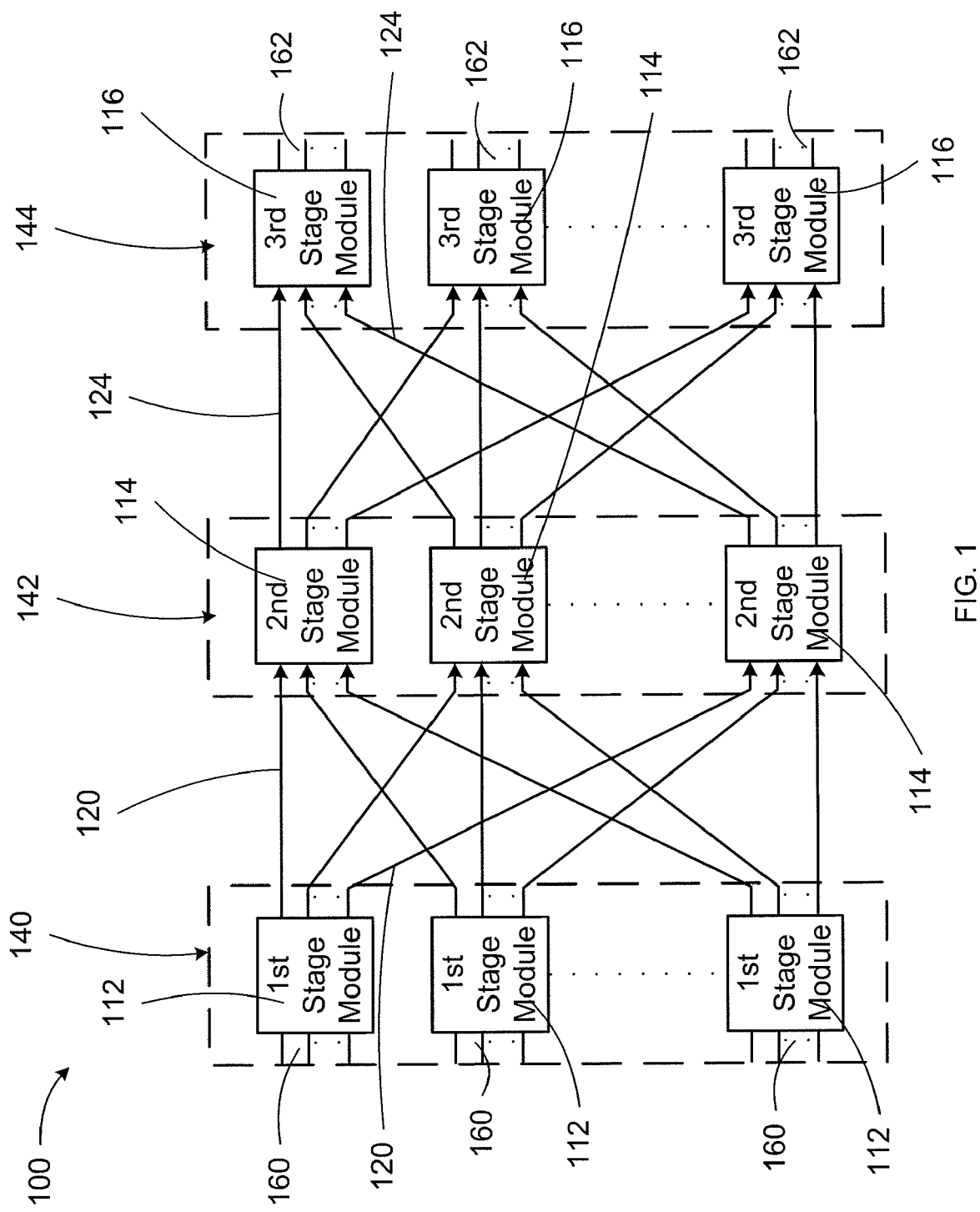
FIG. 1 is a schematic illustration of a switch fabric, according to an embodiment.

In some embodiments, a method includes sending a signal to a first module associated with a stage of a switch fabric and receiving a signal from the first module a first amount of time after the sending the signal to the first module. A signal is sent to a second module associated with the stage of the switch fabric and a signal is received from the second module a second amount of time after the sending the signal to the second module. The second amount of time is less than the first amount of time. A cell of a first data packet is sent to the first module and a cell of a second data packet is sent to the second module a third amount of time after the sending the cell of the first data packet. The third amount of time is associated with the difference between the first amount of time and the second amount of time.

In some embodiments, the signal sent to the first module and the signal received from the first module can be used to determine the time for a cell to be sent to the first module. Similarly, in some embodiments, the signal sent to the second module and the signal received from the second module can be used to determine the time for a cell to be sent to the second module.

In some embodiments, the third amount of time compensates for the difference in the time to send a cell to the first module and the time to send a cell to the second module. In some embodiments, the time to send a cell to the first module can be different from the time to send a cell to the second module because a cable through which the cell is sent to the first module can be longer than a cable through which the cell is sent to the second module. The difference in the time to send a cell to the first module and the time to send a cell to the second module can be compensated so that cells sent to an input module of a switch fabric in an order are received at an output module of the switch fabric in the order.

As used herein, a switch fabric is, for example, a network that includes multiple stages of switch modules that operatively connect one or more input devices with one or more output devices. A switch fabric is configured to receive a signal from an input device, forward the signal through the multiple stages of the switch fabric, and output the signal to an output device. Switch modules of the multiple stages of switches route the signal such that the signal arrives at its destination. Such a switch fabric can be referred to, for example, as a Clos network.

As used herein, a module that is within a switch fabric can be, for example, any assembly and/or set of operatively coupled electrical components that defines one or more switches within a stage of a switch fabric. An input/output module, for example, can be any assembly and/or set of operatively coupled electrical components configured to send data to and/or receive data from a switch fabric. In some embodiments, for example, an input/output module can be an access switch configured receive data from a server, prepare data to enter into the switch fabric, and send the data to the switch fabric. In some embodiments, a module can include, for example, a memory, a processor, electrical traces, optical connectors, and/or the like.

As used herein, "associated with" means, for example, included in, physically located with, a part of, and/or operates or functions as a part of. For example, a module associated with a first stage of a switch fabric can be said to be included in, physically located with or a part of the first stage of the switch fabric. A module associated with a first stage of a switch fabric can also be said to operate or function as a part of the first stage of the switch fabric.

As used in this specification, the singular forms "a," "an" and "the" include plural referents unless the context clearly dictates otherwise. Thus, for example, the term "a switch fabric" is intended to mean a single switch fabric or a combination of switch fabrics.

The terms "first stage", "second stage" and so on refer to portions, modules or nodes within a switch fabric. In some instances, these terms refer to a specific stage within a given switch fabric. For example, a three-stage Clos network includes three consecutive stages from ingress to egress; such a switch fabric has three stages that can be referred to as the "first stage" (the first stage with respect to the ingress to egress direction) through the third stage (the third and final stage with respect to the ingress to egress direction). For example, FIGS. 1 and 4 refer to specific stages within a given switch fabric. In other instances, however, the terms "first stage", "second stage" and so on refer to any stage within the stage fabric and correspond to the order of discussion of a given stage. For example, the "first stage" can refer to the first stage discussed and can correspond to any stage within the switch fabric (e.g., the third stage within a three-stage Clos network), and the "second stage" can refer to a remaining stage within the switch fabric (e.g., the second stage within the three-stage Clos network). Thus, it should be understood that the specific context will indicate whether the terms "first stage", "second stage" and so on can refer to a specific ordinal stage within a switch fabric or can refer to any particular stage within the switch fabric.

FIG. 1 is a schematic illustration of a switch fabric 100, according to an embodiment. Switch fabric 100 is a three-stage, non-blocking Clos network and includes a first stage 140, a second stage 142, and a third stage 144. The first stage 140 includes modules 112. Each module 112 of the first stage 140 is an assembly of electronic components and circuitry. In some embodiments, for example, each module is an application-specific integrated circuit (ASIC). In other embodiments, multiple modules are contained on a single ASIC or a single chip package. In still other embodiments, each module is an assembly of discrete electrical components.

In some embodiments, each module 112 of the first stage 140 is a cell switch. The cell switches are configured to redirect data as it flows through the switch fabric 100. In some embodiments, for example, each cell switch includes multiple input ports operatively coupled to write interfaces on a memory buffer (not shown). Similarly, a set of output ports are operatively coupled to read interfaces on the memory buffer. In some embodiments, the memory buffer can be a shared memory buffer implemented using on-chip static random access memory (SRAM) to provide sufficient bandwidth for all input ports to write one incoming cell (e.g., a portion of a data packet) per time period (e.g., one or more clock cycles) and all output ports to read one outgoing cell per time period. Each cell switch operates similar to a crossbar switch that can be reconfigured subsequent each time period.

In alternate embodiments, each module of the first stage is a crossbar switch having input bars and output bars. Multiple switches within the crossbar switch connect each input bar with each output bar. When a switch within the crossbar switch is in an "on" position, the input is operatively coupled to the output and data can flow. Alternatively, when a switch within the crossbar switch is in an "off" position, the input is not operatively coupled to the output and data cannot flow. Thus, the switches within the crossbar switch control which input bars are operatively coupled to which output bars.

Each module 112 of the first stage 140 includes a set of input ports 160 configured to receive data (e.g., a signal, a cell of a packet, etc.) as it enters the switch fabric 100. In this embodiment, each module 112 of the first stage 140 includes the same number of input ports 160.

Similar to the first stage 140, the second stage 142 of the switch fabric 100 includes modules 114. The modules 114 of the second stage 142 are structurally similar to the modules 112 of the first stage 140. Each module 114 of the second stage 142 is operatively coupled to each module 112 of the first stage 140 by a data path 120. Each data path 120 between a given module 112 of the first stage 140 and a given module 114 of the second stage 142 is configured to facilitate data transfer from the modules 112 of the first stage 140 to the modules 114 of the second stage 142.

The data paths 120 between the modules 112 of the first stage 140 and the modules 114 of the second stage 142 can be constructed in any manner configured to facilitate data transfer from the modules 112 of the first stage 140 to the modules 114 of the second stage 142. In some embodiments, for example, the data paths 120 can be optical cables having various lengths. Because the data paths 120 can vary in length, the time to send a first cell of a data packet from a module of the first stage 140 to a first module of the second stage 142 can be less than the time to send a second cell of a data packet from the module of the first stage 140 to a second module of the second stage 142. Without compensation as described herein, this can cause synchronization issues. For example, without compensation as described herein, cells of a data packet might not reach the output port 162 of the module 116 of the third stage 144 in the correct order (e.g., the order in which the cells entered the input port 160 of the module 112 of the first stage 140). In some embodiments, the module of the first stage 140 can delay sending the first cell of the data packet to the module 114 of the second stage 142 such that the delay and the transit time of the first cell is substantially equal to the transit time of the second cell.

In other embodiments, the data paths are within a midplane. Such a midplane can be similar to that shown and described in U.S. patent application Ser. No. 12/345,500, filed Dec. 29, 2008, entitled "System Architecture for Highly Scalable and Distributed Multi-Stage Switch Fabric," and U.S. patent application Ser. No. 12/345,502, filed Dec. 29, 2008, entitled "Methods and Apparatus related to a Modular Switch Architecture," both of which are incorporated herein by reference in their entireties. Such a midplane can be used to connect each module of the second stage with each module of the first stage. In still other embodiments, two or more modules are contained within a single chip package and the data paths are electrical traces.

In some embodiments, the switch fabric 100 is a non-blocking Clos network. Thus, the number of modules 114 of the second stage 142 of the switch fabric 100 varies based on the number of input ports 160 of each module 112 of the first stage 140. In a rearrangeably non-blocking Clos network (e.g., a Benes network), the number of modules 114 of the second stage 142 is greater than or equal to the number of input ports 160 of each module 112 of the first stage 140. Thus, if n is the number of input ports 160 of each module 112 of the first stage 140 and m is the number of modules 114 of the second stage 142, $m \geq n$. In some embodiments, for example, each module of the first stage has five input ports. Thus, the second stage has at least five modules. All five modules of the first stage are operatively coupled to all five modules of the second stage by data paths. Said another way, each module of the first stage can send data to any module of the second stage.

The third stage 144 of the switch fabric 100 includes modules 116. The modules 116 of the third stage 144 are structurally similar to the modules 112 of the first stage 140. The number of modules 116 of the third stage 144 is typically equivalent to the number of modules 112 of the first stage 140. Each module 116 of the third stage 144 includes output ports 162 configured to allow data to exit the switch fabric 100. Each module 116 of the third stage 144 includes the same number of output ports 162. Further, the number of output ports 162 of each module 116 of the third stage 144 is typically equivalent to the number of input ports 160 of each module 112 of the first stage 140.

Each module 116 of the third stage 144 is connected to each module 114 of the second stage 142 by a data path 124. The data paths 124 between the modules 114 of the second stage 142 and the modules 116 of the third stage 144 are configured to facilitate data transfer from the modules 114 of the second stage 142 to the modules 116 of the third stage 144.

The data paths 124 between the modules 114 of the second stage 142 and the modules 116 of the third stage 144 can be constructed in any manner configured to facilitate data transfer from the modules 114 of the second stage 142 to the modules 116 of the third stage 144. In some embodiments, for example, the data paths 124 include optical connectors and optical cables between the modules. In other embodiments, the data paths are within a midplane. In still other embodiments, two or more modules are contained within a single chip package and the data paths are electrical traces.

Figure 2:
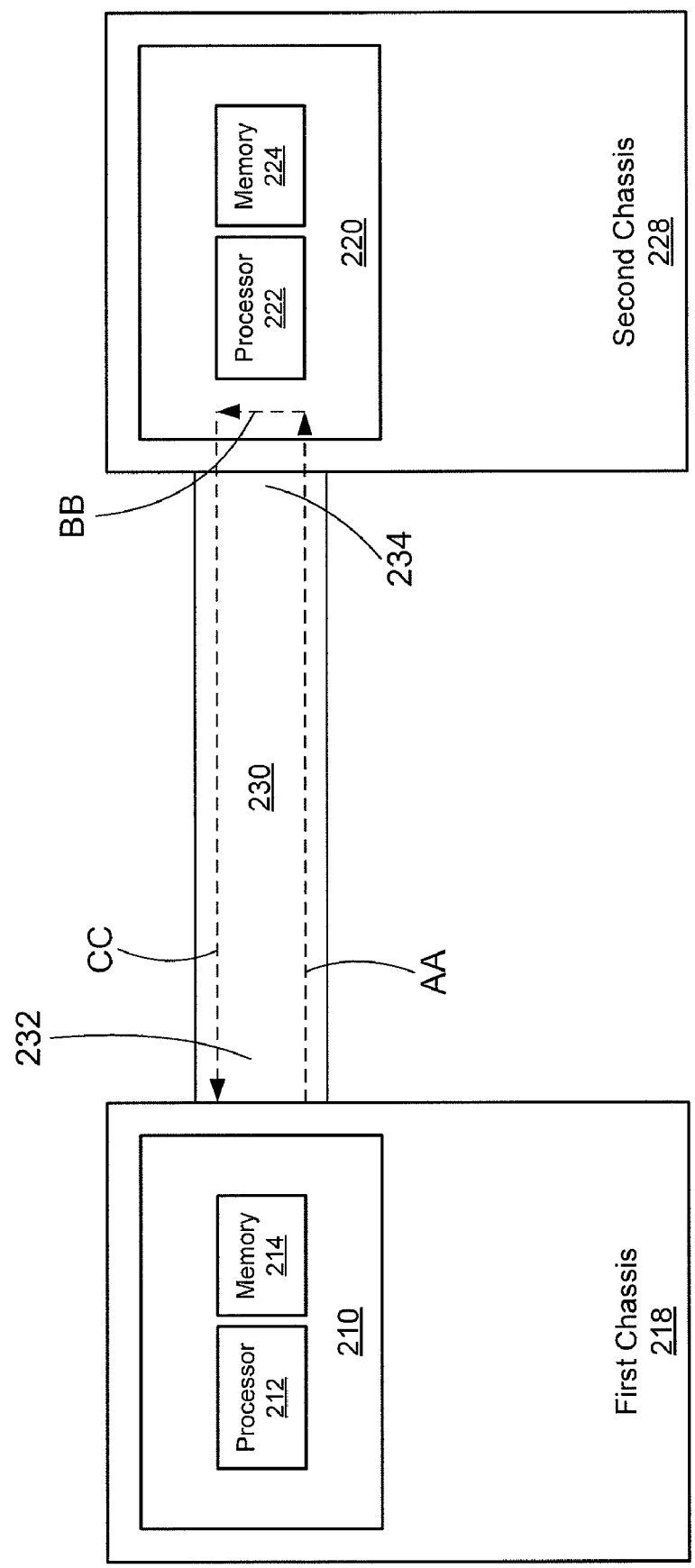
FIG. 2 is a schematic illustration of two modules within a switch fabric coupled together by a cable, according to another embodiment.

FIG. 2 is a schematic illustration of a first module 210 within a switch fabric and a second module 220 within the switch fabric. The first module 210 is operatively coupled to the second module by a cable 230. The cable 230 can be any cable configured to operatively couple the first module 210 with the second module 220. In some embodiments, for example, the cable 230 can be an optical connection including at least one optical fiber.

The first module 210 is associated with a stage of the switch fabric. In some embodiments, for example, the first module 210 can be associated with the first stage of a switch fabric and is configured to receive cells of a data packet from an input module, as further described herein. In other embodiments, the first module can be associated with a middle stage of a switch fabric (e.g., a second stage of a three-stage switch fabric). In such embodiments, the first module receives cells from a prior stage of a switch fabric (e.g., a first stage) and sends cells to a subsequent stage of the switch fabric (e.g., a third stage).

The first module 210 includes a processor 212 and a memory 214. The processor 212 can be any processor configured to receive a cell of a data packet from a module of a previous stage of the switch fabric or an input module, and send the cell of the data packet to a subsequent stage of the switch fabric (e.g., the second module 220) or an output module. In some embodiments, for example, the first module 210 is an application-specific integrated circuit (ASIC) having the processor 212 and the memory 214. In other embodiments, the memory can be, for example, a random access memory (RAM), a memory buffer, a hard drive, and/or so forth.

The first module 210 is disposed within a first chassis 218. In some embodiments, the first chassis 218 can include other modules associated with the stage of the switch fabric with which the first module 210 is associated. In other embodiments, modules of different stages can also be included within the first chassis. In such embodiments, for example, if the first module is associated with a first stage of the switch fabric, the first chassis can include modules associated with a fifth stage of the switch fabric (e.g., FIG. 4). Similarly, in such embodiments, if the first module is associated with a second stage of the switch fabric, the first chassis can include modules associated with a third stage of the switch fabric and a fourth stage of the switch fabric (e.g., FIG. 4). In still other embodiments, the first chassis can include modules of any stage of the switch fabric.

Similar to the first module 210, the second module 220 is associated with a stage of the switch fabric. The second module 220 is associated with a stage of the switch fabric that is directly subsequent to the stage of the switch fabric with which the first module 220 is associated. In some embodiments, for example, the second module 220 can be associated with the final stage of a switch fabric and can be configured to send cells of a data packet to an output module. In other embodiments, the second module can be associated with a middle stage of a switch fabric (e.g., a second stage of a three-stage switch fabric). In such embodiments, the second module receives cells from a module of a prior stage of a switch fabric (e.g., a module of a first stage) and sends cells to a module of a subsequent stage of the switch fabric (e.g., a module of a third stage).

The second module 220 includes a processor 222 and a memory 224. In some embodiments, for example, the second module 220 is an application-specific integrated circuit (ASIC) having the processor 222 and the memory 224. In other embodiments, the memory can be, for example, a random access memory (RAM), a memory buffer, a hard drive, and/or so forth.

The processor 222 can be similar to the processor 212. In some embodiments, the processor 222 has a first configuration and a second configuration. When the processor 222 is in its first configuration, it is configured to receive a cell of a data packet from a module of a previous stage of the switch fabric (e.g., the first module 210) or an input module, and send the cell of the data packet to a module of a subsequent stage of the switch fabric or an output module. When the processor 222 is in its second configuration, it is configured to receive a cell from a module of a previous stage of the switch fabric (e.g., the first module 210) and send the cell back to the module of the previous stage of the switch fabric. A transit time for the data connection (e.g., cable 230) between the module of the previous stage of the switch fabric (e.g., the first module 210) and the second module 220 can be determined when the processor 222 is in its second configuration, as described in further detail herein. In some embodiments, the second configuration can be called a loop-back configuration and/or a loop-back mode.

The processor 222 can be switched from its first configuration and its second configuration by receiving a signal from the module of the previous stage of the switch fabric (e.g., the first module 210). In such embodiments, for example, the first module 210 can send a signal to the second module 220 instructing the processor 222 to switch from its first configuration to its second configuration. In other embodiments, a central control processor (not shown in FIG. 2) can send a signal to the second module that instructs the processor to switch from its first configuration to its second configuration. In some embodiments, the processor 222 can be switched from its second configuration to its first configuration using a similar process.

The second module 220 is disposed within a second chassis 228. In some embodiments, the second chassis 228 can include other modules associated with the stage of the switch fabric with which the second module 220 is associated. In other embodiments, modules of different stages can also be included within the second chassis. In such embodiments, for example, if the second module is associated with a fifth stage of the switch fabric, the second chassis can include modules associated with a first stage of the switch fabric (e.g., FIG. 4). Similarly, in such embodiments, if the second module is associated with a second stage of the switch fabric, the second chassis can include modules associated with a third stage of the switch fabric and a fourth stage of the switch fabric (e.g., FIG. 4). In still other embodiments, the second chassis can include modules of any stage of the switch fabric.

In use, the first module 210 is operatively coupled to the second module 220 by coupling a first end portion 232 of the cable 230 to the first chassis 218 and coupling a second end portion 234 of the cable 230 to the second chassis 228. The first module 210 then puts the processor 222 of the second module 220 into its second configuration by sending a signal to the second module 220 via the cable 230. In other embodiments, a central control processor (not shown in FIG. 2) sends the signal to put the processor of the second module into its second configuration to the second module. In yet other embodiments, the second module can be automatically put into its second configuration when the second end portion of the cable is coupled to the second chassis.

In some embodiments, the first module 210 can send the signal to the second module 220 in response to the cable 230 being coupled to the first chassis 218 and/or the second chassis 228. In such embodiments, the signal is automatically sent from the first module 210 to the second module 210. In other embodiments, the first module can send the signal to the second module in response to a user supplied indication. In such embodiments, a user can supply the indication to the first module and/or a central control processor and the first module and/or the central control processor can send the signal to put the processor of the second module into its second configuration. In yet other embodiments, a user can supply the indication directly to the second module via a user interface associated with the second module.

In some embodiments, the second module 220 sends an acknowledgment signal back to the first module 210 via the cable 230. The acknowledgment signal is sent to the first module 210 once the processor 222 of the second module 220 is in its second configuration. The acknowledgment signal is configured to indicate to the first module 210 that the processor 222 of the second module 220 is in its second configuration. In other embodiments, the acknowledgment signal can be sent to the central control processor which can relay the acknowledgment signal to the first module. In yet other embodiments, the second module does not send an acknowledgment signal and the first module assumes the processor of the second module is in its second configuration after a given amount of time has passed since sending the signal to the second module.

Once the processor 222 of the second module 220 is in its second configuration, the first module 210 can determine the time for a cell to be sent from the first module 210 to the second module 220. The first module 210 sends a cell to the second module 220 via the cable 230. This is illustrated by the path AA in FIG. 2. When the first module 210 sends the cell, the processor 212 of the first module 210 starts a timer. In some embodiments, the timer can have a resolution on the order of nanoseconds. In such embodiments, the timer can differentiate transit times having a difference of approximately one nanosecond. In other embodiments, the timer can differentiate transit times having a difference less than one nanosecond.

In some embodiments, the first module 210 sends the cell to the second module 220 in response to the acknowledgment signal received from the second module 220. In other embodiments, the first module sends the cell to the second module in response to a user supplied indication and/or the like.

The second module 220 receives the cell from the first module 210. The processor 222 of the second module 220 is in its second configuration and thus sends the cell back to the first module 210 via the cable 230. Path BB in FIG. 2 illustrates the processing of the cell at the second module prior to sending the cell back to the first module 210. In some embodiments, the processing of the cell at the second module 220 is substantially constant. Said another way, the second module 220 takes substantially the same amount of time to process the cell each time the second module 220 receives a cell when the processor 222 is in its second configuration. Path CC in FIG. 2 illustrates sending the cell from the second module 220 to the first module 210.

The first module 210 receives the cell from the second module 220 via the cable 230. Once the first module 210 receives the cell, the processor 212 of the first module 210 stops the timer that was started when the first module 210 initially sent the cell. The timer indicates the time for the cell to travel from the first module 210 to the second module 220 (path AA), the time for the second module 220 to process the cell (path BB) and the time for the cell to travel from the second module 220 to the first module 210 (path CC). To determine the amount of time for a cell to be sent from the first module 210 to the second module 220 via the cable 230, the processor 212 subtracts the processing time at the second module 220 and divides the result by two. As discussed above, the processing time at the second module 220 is substantially constant. Thus, the memory 214 of the first module 210 can be programmed to include an indication of the substantially constant processing time. The result of subtracting the processing time (path BB) from the total time is the time for a cell to travel the between the first module 210 and the second module 220 via the cable 230 twice (path AA and path CC). Accordingly, to determine the time for a cell to travel between the first module 210 and the second module 220 via the cable 230 once (path AA), this result can be divided by two.

Once the first module 210 has calculated the time for a cell to travel between the first module 210 and the second module 220, it can use this information to synchronize the travel time between the first module 210 and the second module 220 with the time for a cell to travel from the first module 210 to other modules of the second stage of the switch fabric.

In some embodiments, the time for a cell to travel between the first module 210 and the second module 220 can be used to determine the length of the cable 230. The length of the cable 230 can be calculated by multiplying the transit time with the speed the signal travels through the cable 230. In some embodiments, for example, calculating the length of the cable 230 can be used to ensure that cables have authorized cable lengths and/or to be compared with the lengths of the other cables in the switch fabric to determine the longest cable.

In some embodiments, the length of the cable 230 can be automatically stored in a register of the memory 214. Such a register can be used to compare lengths of the various cables and compensate for the different lengths of the cables within a switch fabric system. In other embodiments, the transit time itself is automatically stored in the memory and is used to compensate for the different lengths of cables within the switch fabric system. In embodiments not using an automatic cable length detection method, the length of the cable can be entered into the register of the memory manually (e.g., by user input). Such manual entry of the length of the cable can be tedious and/or subject to user error.

In other embodiments, the time for a cell to travel between the first module and the second module can be determined by sending as many signals as possible in a predetermined time period between the first module and the second module. In such embodiments, for example, the first module can start a timer and then send a signal to the second module via the cable. The second module can then send a signal to the first module in response to receiving the signal from the first module. In response to receiving the signal from the second module, the first module can send a another signal to the second module. This cycle can be repeated until the timer at the first module reaches a predetermined time. To determine the amount of time for a cell to be sent from the first module to the second module via the cable, the time period is divided by the number of times (or cycles) a signal was sent across the cable, and any processing time at the second module and/or the first module is subtracted. This approach can also be used to calculate the length of the cable between the first module and the second module using the speed the signal travels through the cable, as described above.

Figure 3:
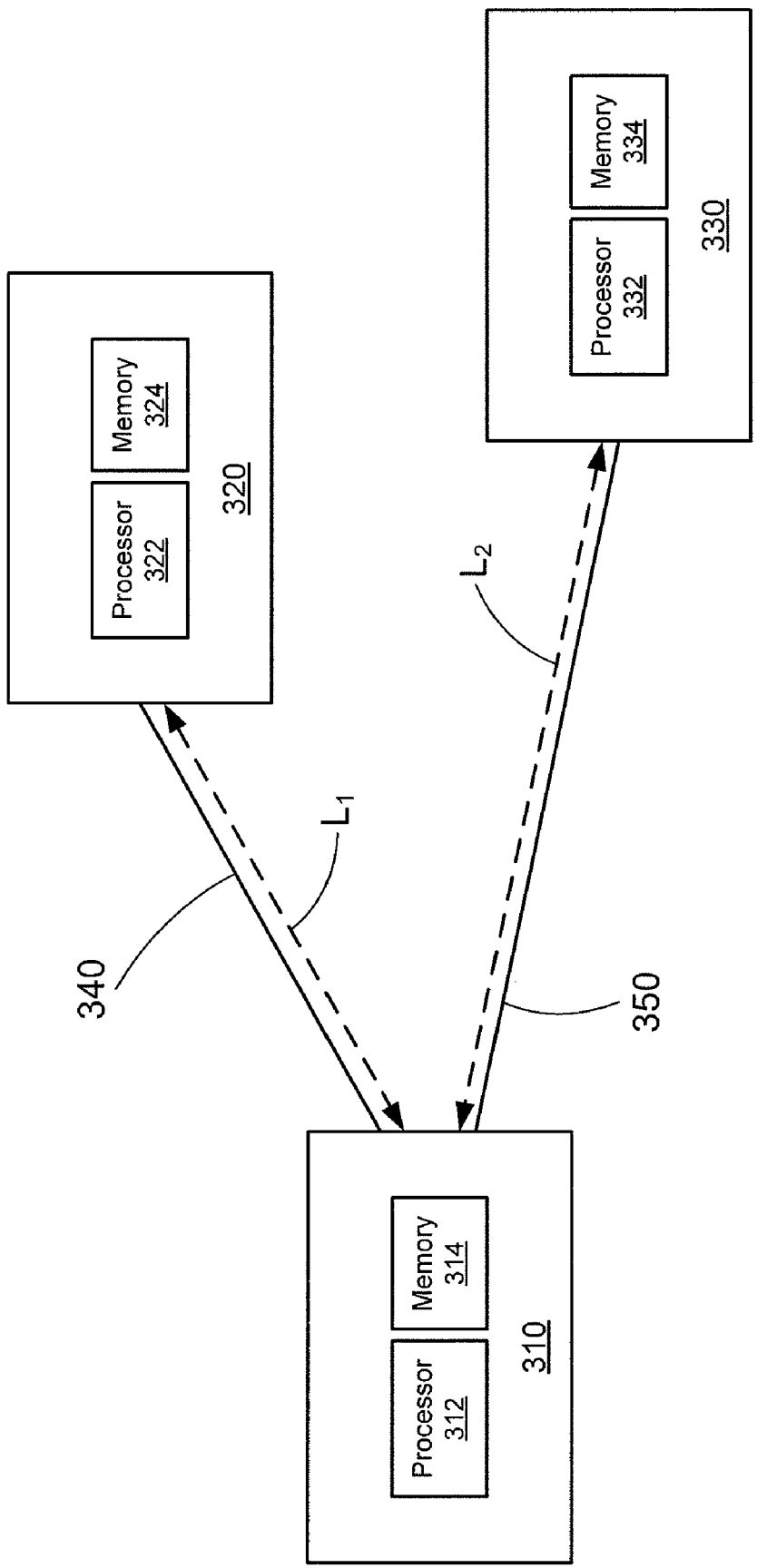
FIG. 3 is a schematic illustration of a module associated with a first stage of a switch fabric coupled to two modules associated with a second stage of the switch fabric, according to another embodiment.

FIG. 3 is a schematic illustration of a first module 310 associated with a first stage of a switch fabric operatively coupled to a second module 320 associated with a second stage of the switch fabric and a third module 330 associated with the second stage of the switch fabric, according to another embodiment.

The first module 310 is operatively coupled to the second module 320 via a first cable 340. Similarly, the first module 310 is operatively coupled to the third module 330 via a second cable 350. The cables 340, 350 can be any cables 340, 350 configured to operatively couple the first module 310 with the second module 320 and the third module 330, respectively. In some embodiments, for example, the cables 340, 350 can be optical connections including at least one optical fiber.

The first cable 340 has a length $L_1$ and the second cable has a length $L_2$. The length $L_2$ of the second cable 350 is greater than the length $L_1$ of the first cable 340. Accordingly, a cell sent from the first module 310 via the second cable 350 to the third module 330 has a greater transit time than a cell sent from the first module 310 via the first cable 340 to the second module 320. If uncompensated, this can disrupt the timing of the switch fabric. If uncompensated, for example, cells of a data packet might not reach an output port of a module of a final stage of the switch fabric in the correct order (e.g., the order in which the cells entered an input port of a module of the first stage of the switch fabric). As described in further detail herein, delaying sending certain cells can assist in solving this problem.

The modules 310, 320, 330 are structurally and functionally similar to modules 210, 220, shown and described above. The first module 310 includes a processor 312 and a memory 314. The processor 312 can be any processor configured to receive a cell of a data packet from a module of a previous stage of the switch fabric or an input module, and send the cell of the data packet to a subsequent stage of the switch fabric (e.g., the second module 320 or the third module 330) or an output module. In some embodiments, for example, the first module 310 is an application-specific integrated circuit (ASIC) having the processor 312 and the memory 314. In some embodiments, the memory 314 can be, for example, a random access memory (RAM), a memory buffer, a hard drive, and/or so forth. Similarly, the second module 320 and the third module 330 include processors 322, 332 and memories 324, 334, respectively.

In some embodiments, the processor 322 of the second module 320 has a first configuration and a second configuration. When the processor 322 is in its first configuration, it is configured to receive a cell of a data packet from a module of a previous stage of the switch fabric (e.g., the first module 310) and send the cell of the data packet to a module of a subsequent stage of the switch fabric or an output module. When the processor 322 is in its second configuration, it is configured to receive a cell from a module of a previous stage of the switch fabric (e.g., the first module 310) and send the cell back to the module of the previous stage of the switch fabric. A transit time for the data connection (e.g., cable 340) between the module of the previous stage of the switch fabric (e.g., the first module 310) and the second module 320 can be determined when the processor 322 is in its second configuration, as described in further detail herein.

The processor 322 can be switched from its first configuration and its second configuration by receiving a signal from the module of the previous stage of the switch fabric (e.g., the first module 310). In such embodiments, for example, the first module 310 can send a signal to the second module 320 that instructs the processor 322 to switch from its first configuration to its second configuration. In other embodiments, a central control processor (not shown in FIG. 3) can send a signal to the second module that instructs the processor to switch from its first configuration to its second configuration. In some embodiments, the processor 322 can be switched from its second configuration to its first configuration using a similar process.

Similar to the processor 322 of the second module 320, the processor 332 of the third module 330 has a first configuration and a second configuration. The processor 332 can be switched between its first configuration and its second configuration similar to the processor 322.

In use, the processor 322 of the second module 320 is switched into its second configuration and the first module 310 determines the time for a cell to be sent from the first module 310 to the second module 320 via the first cable 340 using the methods described above in relation to FIG. 2. Similarly, the processor 332 of the third module 330 is switched into its second configuration and the first module 310 determines the time for a cell to be sent from the first module 310 to the third module 330 via the second cable 350. Both the processor 322 and the processor 332 can then be switched from their second configurations to their first configurations.

Without compensation, the time to send a cell from the first module 310 to the second module 320 via the first cable 340 is less than the time to send a cell from the first module 310 to the third module 330 via the second cable 350 because the length $L_1$ of the first cable 340 is less than the length $L_2$ of the second cable 350. Said another way, if the first module 310 sends a cell to the second module 320 at the same time the first module 310 sends a cell to the third module 330, the cell sent to the second module 320 will reach the second module 320 before the cell sent to the third module 330 reaches the third module 330, unless this time difference is compensated.

To ensure that the cell sent to the third module 330 reaches the third module 330 at substantially the same time the cell sent to the second module 320 reaches the second module 320, the cell sent to the second module 320 can be delayed at the first module 310 before sending. Said another way, cells to be sent across shorter links can be delayed so that a cell takes the same amount of time between each stage of the switch fabric as another cell (e.g., one cell does not pass through the switch fabric faster than another cell).

In some embodiments, for example, if the first module 310 sends a cell to the second module 320, the cell can be stored in the memory 314 of the first module 310 for a time prior to being sent. The amount of the time that the cell is stored is substantially equal to the difference in the time for a cell to travel from the first module 310 to the third module 330 and the time for a cell to travel from the first module 310 to the second module 320. Thus, a cell sent from the first module 310 can take substantially the same amount of time to reach the second module 320 as a cell sent from the first module 310 takes to reach the third module 330.

Figure 4:
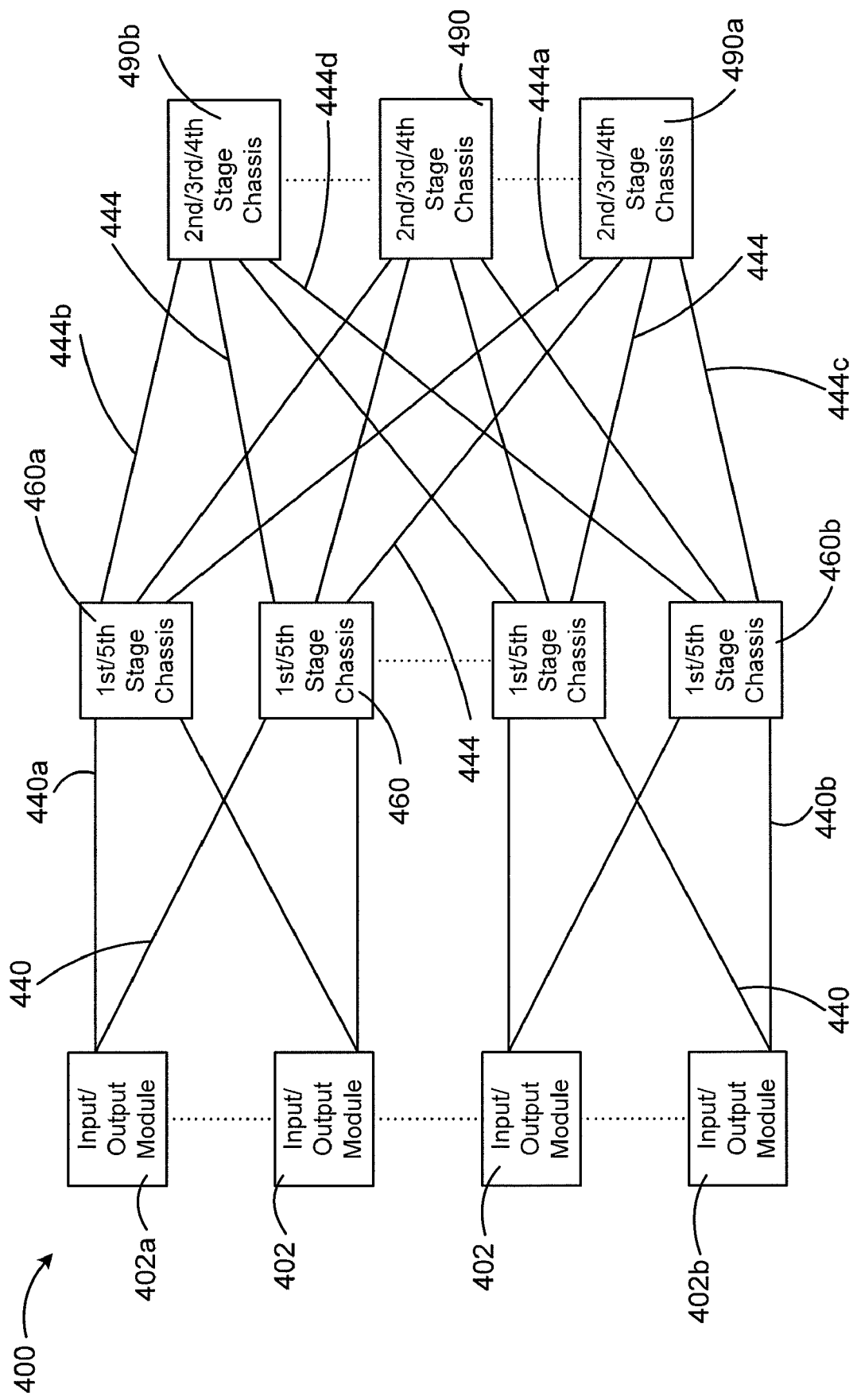
FIG. 4 is a schematic illustration of a five-stage switch fabric system, according to another embodiment.

FIG. 4 is a schematic illustration of a five-stage switch fabric system 400, according to another embodiment. The switch fabric system 400 includes multiple input/output modules 402, multiple 1st/5th stage chassis, multiple 2nd/3rd/4th stage chassis 490, a first set of cables 440, and a second set of cables 444. In some embodiments, the switch fabric system 400 can be structurally and functionally similar to the switch fabrics shown and described in U.S. patent application Ser. No. 12/345,500, filed Dec. 29, 2008, entitled "System Architecture for Highly Scalable and Distributed Multi-Stage Switch Fabric," and U.S. patent application Ser. No. 12/345,502, filed Dec. 29, 2008, entitled "Methods and Apparatus related to a Modular Switch Architecture," both of which are incorporated herein by reference in their entireties.

The input/output modules 402 are configured to send data to and/or receive data from at least one 1st/5th stage chassis 460. Each input/output module 402 is also configured to perform a parsing function, a classifying function, a forwarding function, and a queuing-and-scheduling function. Thus, packet parsing, packet classifying, packet forwarding, and packet queuing-and-scheduling all occur prior to a cell entering a 1st/5th stage chassis 460. Accordingly, these functions do not need to be performed at each stage of the switch fabric, and each module within the 1st/5th stage chassis 460 and each module within the 2nd/3rd/4th stage chassis 490 (described in further detail herein) need not include capabilities to perform these functions. This can reduce the cost, power consumption, cooling requirements and/or the physical area for each module of within the switch fabric. This also can reduce the latency associated with the switch fabric. In some embodiments, for example, the end-to-end latency (e.g., time to send data through the switch fabric from an input/output module 402a to another input/output module 402b) can be lower than the end-to-end latency of a switch fabric system using an Ethernet protocol. In some embodiments, the throughput of the switch fabric can be constrained by the connection density of the switch fabric system 400 and not by power limitations and/or thermal limitations. The parsing function, classifying function, forwarding function, and queuing-and-scheduling function can be performed similar to the functions disclosed in U.S. patent application Ser. No. 12/242,168 entitled "Methods and Apparatus Related to Packet Classification Associated with a Multi-Stage Switch," filed Sep. 30, 2008, and U.S. patent application Ser. No. 12/242,172, entitled "Methods and Apparatus for Packet Classification Based on Policy Vectors," filed Sep. 30, 2008, both of which are incorporated herein by reference in their entireties.

Each input/output module 402 is configured to connect to a first end of a cable of the first set of cables 440. Each cable 440 operatively couples an input/output module 402 to a 1st/5th stage chassis 460. The first set of cables 440 can be constructed of any material suitable to transfer data between the input/output modules 402 and the 1st/5th stage chassis 460. In some embodiments, for example, each cable 440 is constructed of multiple optical fibers. In such an embodiment, each cable 440 can have twelve transmit fibers and twelve receive fibers. The twelve transmit fibers of each cable 440 can include eight fibers for transmitting data, one fiber for transmitting a control signal, and three fibers for expanding the data capacity and/or for redundancy. Similarly, the twelve receive fibers of each cable 440 have eight fibers for receiving data, one fiber for receiving a control signal, and three fibers for expanding the data capacity and/or for redundancy. In other embodiments, any number of fibers can be contained within each cable. The transmit and receive designations of the fibers are from the perspective of the input/output modules 402. The designations are opposite if viewed from the perspective of the 1st/5th stage chassis 460.

In some embodiments, the cables from the first set of cables 440 are not equal in length. In such embodiments, for example, a first input/output module 440 can be disposed a further distance away from a 1st/5th stage chassis 460 to which it is coupled than a second input/output module 440 coupled to the same 1st/5th stage chassis 460. In such embodiments, a longer cable can be used between the first input/output module 440 and the 1st/5th stage chassis 460 than is used between the second input/output module 440 and the 1st/5th stage chassis 460.

In some embodiments, each input/output module 402 can be coupled to multiple 1st/5th stage chassis 460. In the embodiment illustrated in FIG. 4, for example, each input/output module 402 is coupled to two 1st/5th stage chassis 460. Two 1st/5th stage chassis 460 can be used for redundancy and/or greater capacity. In still other embodiments, more than two 1st/5th stage chassis can be used for increased redundancy and/or greater capacity. For example, four 1st/5th stage chassis can be operatively coupled to each input/output module by, for example, four cables.

Each 1st/5th stage chassis 460 includes modules associated with a first stage of the switch fabric and modules associated with a fifth stage of the switch fabric. In some embodiments, the modules within the 1st/5th stage chassis 460 can be disposed on line cards. In such embodiments, each line card can include multiple modules. For example, a line card can include both modules associated with the first stage of the switch fabric and/or modules associated with the fifth stage of the switch fabric. The modules within the 1st/5th stage chassis 460 can be structurally and functionally similar to the modules shown and described above.

Similarly, each 2nd/3rd/4th stage chassis 490 includes modules associated with a second stage of the switch fabric, modules associated with a third stage of the switch fabric and modules associated with a fourth stage of the switch fabric. In some embodiments, the modules within the 2nd/3rd/4th stage chassis 490 can be disposed on line cards. In such embodiments, each line card can include multiple modules. For example, a line card can include modules associated with the second stage of the switch fabric, modules associated with the third stage of the switch fabric and/or modules associated with the fourth stage of the switch fabric. The modules within the 2nd/3rd/4th stage chassis 490 can be structurally and functionally similar to the modules shown and described above.

Each 1st/5th stage chassis 460 is operatively coupled to each 2nd/3rd/4th stage chassis 490 via the second set of cables 444. The cables from the second set of cables 444 can be structurally and functionally similar to the cables from the first set of cables 440.

In some embodiments, the cables from the second set of cables 444 have varying lengths. For example, in FIG. 4, a first 2nd/3rd/4th stage chassis 490a can be disposed at a location further away from a first 1st/5th stage chassis 460a than a second 2nd/3rd/4th stage chassis 490b. Accordingly, a longer cable can be used to operatively couple the first 1st/5th stage chassis 460*a* to the first 2nd/3rd/4th stage chassis 490*a* than the length of the cable used to operatively couple the first 1st/5th stage chassis 460*a* to the second 2nd/3rd/4th stage chassis 490*b*. In such embodiments, the time for a cell to move from the first 1st/5th stage chassis 460*a* to the first 2nd/3rd/4th stage chassis 490*a* is greater than the time for a cell to move from the first 1st/5th stage chassis 460*a* to the second 2nd/3rd/4th stage chassis 490*b*.

In some embodiments, a large number of cables from the first set of cables 440 and the second set of cables 444 can be used to operatively couple the input/output modules 402 with the 1st/5th stage chassis 460 and to operatively couple the 1st/5th stage chassis 460 with the 2nd/3rd/4th stage chassis 490. In some embodiments, for example, a switch fabric system 400 includes 4,096 input/output modules 402 each operatively coupled to two of 64 1st/5th stage chassis 460. In such embodiments, 8,192 cables from the first set of cables 440 can be used. Additionally, in some embodiments, each 64 1st/5th stage chassis 460 can be operatively coupled to 32 2nd/3rd/4th stage chassis 490. In such embodiments, 2,048 cables from the second set of cables 444 can be used. Accordingly, in such embodiments, a total of 10,240 cables can be used. In such large configurations, manually inputting delay times for varying cable lengths can be a significant burden. In other embodiments, more than 10,240 cables can be used. In such embodiments, for example, each stage of the switch fabric can be disposed within a separate chassis and cables can be used between each stage of the switch fabric. In still other embodiments, less than 10,240 cables can be used.

In use, the time for a cell to be sent across each of the cables from the first set of cables 440 is determined using the methods shown and described above. In some embodiments, the time for a cell to be sent across each cable from the first set of cables 440 is compared with the time for a cell to be sent across every other cable from the first set of cables 440 to determine the longest time. In other embodiments, a length of the longest cable in the first set of cables is previously determined or obtained and stored in a memory of each module of the system. In such embodiments, the time for a cell to be sent across each cable from the first set of cables 440 does not need to be compared with the time for a cell to be sent across every other cable from the first set of cables because the longest time can be calculated using the length of the longest cable. Similarly, the time for a cell to be sent across each cable from the second set of cables 444 is determined using the methods shown and described above. The time for a cell to be sent across each cable 440, 444 in the switch fabric system 400 can be stored in the memories of the modules to which each cable is coupled and used to automatically compensate for the differences in the transit times.

Once the time for a cell to be sent across each cable 440, 444 is determined and stored within the memories of the modules, a data packet can be sent from a first input/output module 402*a* to a second input/output module 402*b* via the switch fabric. In some embodiments, for example, the first input/output module 402*a* receives a data packet and parses the data packet into multiple cells. The multiple cells can then be sent into the switch fabric in the order in which they were parsed. For example, a first cell from the multiple cells is sent across cable 440*a* and into a first stage module within 1st/5th stage chassis 460*a* prior to a second cell being sent across cable 440*a* and into a first stage module within 1st/5th stage chassis 460*a*.

These multiple cells can be sent across the switch fabric (e.g., 1st/5th stage chassis 460 and 2nd/3rd/4th stage chassis 490) to a destination port at the second input/output module 402*b*. For example, the first cell is sent from a first stage module within the first 1st/5th stage chassis 402*a* to a second stage module within the 2nd/3rd/4th stage chassis 490*a* via the cable 444*a*, and from a fourth stage module within the 2nd/3rd/4th stage chassis 490*a* to a fifth stage module within the 1st/5th stage chassis 460*b* via the cable 444*c*. The first cell can then be sent to the input/output module 402*b* via cable 440*b*. Similarly, for example, the second cell is sent from a first stage module within the first 1st/5th stage chassis 402*a* to a second stage module within the 2nd/3rd/4th stage chassis 490*b* via the cable 444*b*, and from the 2nd/3rd/4th stage chassis 490*b* to a fifth stage module within the 1st/5th stage chassis 460*b* via the cable 444*d*. The second cell can then be sent to the input/output module 402*b* via cable 440*b*.

If the time for a cell to be sent across each cable 440, 444 is not measured and used to compensate for sending cells from the first input/output module 402*a* to the second input/output module 402*b*, synchronization errors can occur. For example, the second cell might otherwise reach the second input/output module 402*b* prior to the first cell reaching the first input/output module 402*b*. This would involve significant buffering at the second input/output module 402*b* to reconstruct the data packet from the multiple cells. The size of such a memory buffer on the second input/output module would be increased to store the multiple cells as they are reordered. Without compensation, such a situation can occur, for example, if the 2nd/3rd/4th stage chassis 490*a* is disposed at a location further away from the 1st/5th stage chassis 460*a* and/or the 1st/5th stage chassis 460*b* than the 2nd/3rd/4th stage chassis 490*b*. Accordingly, cables 444*a* and 444*c* are longer than cables 444*b* and 444*d*, respectively, and the first cell takes longer to reach the second input/output module 402*b* than the second cell to reach the second input/output module 402*b*. If the time difference is large enough, the second cell can reach the second input/output module 402*b* before the first cell reaches the second input/output module 402*b*.

By determining the difference in the times for a cell to be sent across each cable from the second set of cables 444, this problem can be compensated. For example, the 1st/5th stage chassis 460*a* can delay sending a cell to the 2nd/3rd/4th stage chassis 490*b* an amount of time to compensate for the additional time for a cell to be sent across cable 444*a* to the 2nd/3rd/4th stage chassis 490*a*. Accordingly, with the delay, the effective time to send a cell from the 1st/5th stage chassis 460*a* to the 2nd/3rd/4th stage chassis 490*b* is substantially equal to the time for a cell to be sent from the 1st/5th stage chassis 460*a* to the 2nd/3rd/4th stage chassis 490*a*. Similarly, the 2nd/3rd/4th stage chassis 490*b* can delay sending cells to the 1st/5th stage chassis via the cable 444*d* to compensate for the additional time to send cells from the 2nd/3rd/4th stage chassis 490*a* to the 1st/5th stage chassis 460*b* via the longer cable 444*c*.

In some embodiments, the input/output modules 402 can delay sending cells to the 1st/5th stage chassis 460 and/or the 1st/5th stage chassis 460 can delay sending cells to the input/output modules 402 to compensate for the longest cable 440. In such embodiments, the input/output modules 402 can ensure that cells from various data packets reach the first stage modules within the 1st/5th stage chassis 460 at substantially the same time. Similarly, in such embodiments, each fifth stage module within the 1st/5th stage chassis 460 can ensure that cells from various data packets reach the input/output modules 402 at substantially the same time. This can aid in maintaining the synchronization of the switch fabric system 400.

While multiple cables and/or strands within a cable can be disposed between two chassis, in some embodiments, the detection of the time for a cell to be sent across the cable can be performed for a single strand within a cable disposed between the two chassis. For example, if the detection of the time for a cell to be sent across the strand is performed, this time can be used for all other strands within the cable and/or for all other cables disposed between the two chassis.

Figure 5:
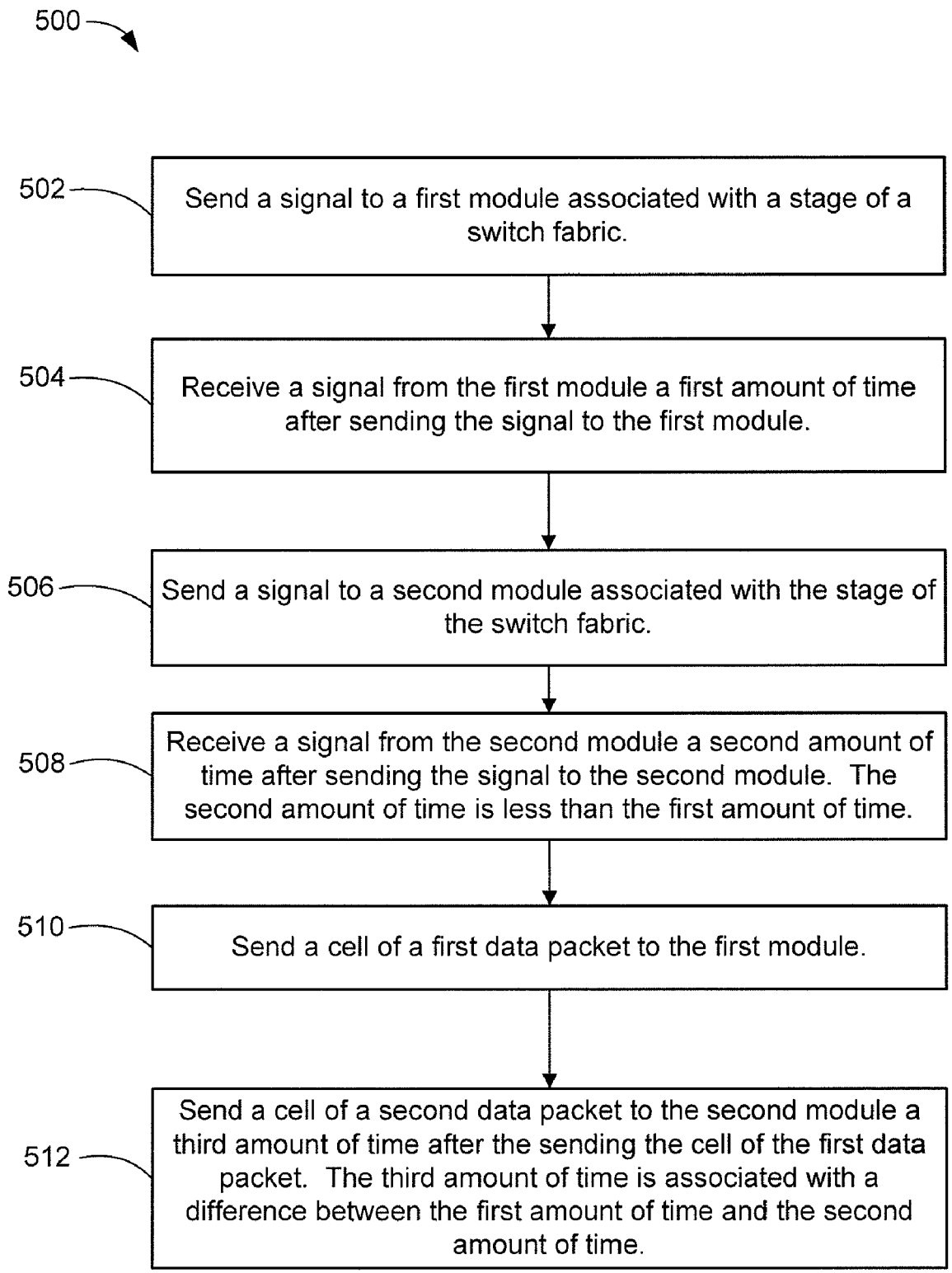
FIG. 5 is a flow chart illustrating a method of sending cells through a switch fabric, according to another embodiment.

FIG. 5 is a flow chart illustrating a method 500 of sending cells through a switch fabric, according to another embodiment. A signal is sent to a first module associated with a stage of a switch fabric, at 502. The module can be similar to the modules shown and described above. In some embodiments, the signal is a cell used to determine the time for a cell to be sent to the module. In some embodiments, the signal is sent via an optical cable. In other embodiments, the signal is sent via an electrical cable, an electrical trace, a midplane, a backplane and/or any other apparatus configured to carry a signal.

A signal is received from the first module a first amount of time after sending the signal to the first module, at 504. In some embodiments, the first module sends the signal to the first module in response to receiving the signal sent to the first module. Based on the time between sending the signal to the first module and receiving the signal from the first module, the time for a cell to be sent to the first module can be calculated. In some embodiments, the length of the cable used to send and receive signals from the first module can be calculated from the time between sending the signal to the first module and receiving the signal from the first module.

A signal is sent to a second module associated with the stage of the switch fabric, at 506. A signal is received from the second module a second amount of time after sending the signal to the second module, at 508. The second amount of time is less than the first amount of time. In some embodiments, this indicates that the cable used to send the signal to and receive the signal from the first module is longer than the cable used to send the signal to and receive the signal from the second module.

A cell of a first data packet is sent to the first module, at 510. A cell of a second data packet is sent to the second module a third amount of time after the sending the cell of the first data packet, at 512. The third amount of time is associated with a difference between the first amount of time and the second amount of time. In some embodiments, delaying sending the cell of the second data packet the third amount of time compensates for the difference in the length of the cable used to send signals to and receive signals from the first module and the length of the cable used to send signals to and receive signals from the second module. This ensures that the cell of the first data packet reaches the first module at substantially the same time that the cell of the second data packet reaches the second module. In other embodiments, the third amount of time can be used to compensate for other differences in the amount of time to send cells to the first module and the second module, such as, for example, differences in the types of cable, differences in the size of the cell being sent, differences in the length of an electrical trace, and/or the like.

While various embodiments have been described above, it should be understood that they have been presented by way of example only, and not limitation. Where methods described above indicate certain events occurring in certain order, the ordering of certain events may be modified. Additionally, certain of the events can be performed concurrently in a parallel process when possible, as well as performed sequentially as described above.

In some embodiments, the method of determining the time for a cell to be sent between a first module and a second module can be used to determine whether an end portion of a cable is coupled correctly. For example, the first module can send a cell to the second module via the cable. If the cable is not coupled to the second module and/or is incorrectly coupled to the second module, the second module will not send a reply cell back to the first module and/or will send an error reply cell back to the first module.

While shown and described in FIG. 4 as being used in a five-stage switch fabric system 400, in other embodiments, the embodiments described herein can be used in a switch fabric system having any number of stages, modules within stages, cables, and/or input/output modules. Additionally, in other embodiments, the embodiments described herein can be used in switch fabric systems having any configuration. In some embodiments, for example, the embodiments described herein can be used in a three-stage switch fabric system having cables between modules from each stage of the switch fabric. Such a switch fabric system can be similar to the switch fabric systems shown and described in U.S. patent application Ser. No. 12/414,825, filed Mar. 31, 2009, entitled "Distributed Multi-Stage Switch Fabric," which is incorporated herein by reference in its entirety.

Some embodiments described herein relate to a computer storage product with a computer- or processor-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as general purpose microprocessors, microcontrollers, Application-Specific Integrated Circuits (ASICs), Programmable Logic Devices (PLDs), and Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

Although various embodiments have been described as having particular features and/or combinations of components, other embodiments are possible having a combination of any features and/or components from any of embodiments where appropriate. In some embodiments, for example, the determination of a time for a cell to be sent between a first module and a second module can be used to determine a length of a cable disposed between the first module and the second module in any of the above described embodiments. As described above, this can be used to determine if the length of the cable being used is supported by the switch fabric.

What is claimed is:

1. A method, comprising:
    sending a signal to a first module associated with a stage of a switch fabric;

receiving a signal from the first module a first amount of time after the sending the signal to the first module;

sending a signal to a second module associated with the stage of the switch fabric;

receiving a signal from the second module a second amount of time after the sending the signal to the second module, the second amount of time being less than the first amount of time;

sending a cell of a first data packet to the first module; and sending a cell of a second data packet to the second module a third amount of time after the sending the cell of the first data packet, the third amount of time being substantially equal to a difference between the first amount of time and the second amount of time.

2. The method of claim 1, wherein the sending the signal to the first module includes sending the signal to the first module via a first cable, the sending the signal to the second module including sending the signal to the second module via a second cable, the second cable having a length less than a length of the first cable.

3. The method of claim 1, wherein the cell of the first data packet is received by the first module associated with the stage of the switch fabric at substantially the same time that the cell of the second data packet is received by the second module associated with the stage of the switch fabric.

4. The method of claim 1, further comprising:
storing the cell of the second data packet in a memory buffer for a time period between the sending the cell of the first data packet and the sending the cell of the second data packet.

5. The method of claim 1, wherein a processing time within the first module between the sending the signal to the first module and the receiving the signal from the first module is substantially the same as a processing time within the second module between the sending the signal to the second module and the receiving the signal from the second module.

6. The method of claim 1, wherein the cell of the first data packet is a first cell of the first data packet, the method further comprising:
sending a second cell of the first data packet to the second module an amount of time after sending the cell of the second data packet to the second module.

7. The method of claim 1, wherein the stage of the switch fabric is a first stage of the switch fabric, the method further comprising:
receiving the cell of the first data packet from a module associated with a second stage of the switch fabric.

8. The method of claim 1, wherein the stage of the switch fabric is a first stage of the switch fabric, the method further comprising:
receiving a signal from a module associated with a second stage of the switch fabric; and
sending a signal to the module associated with the second stage in response to the receiving the signal from the module associated with the second stage, the module associated with the second stage configured to determine a length of a cable coupled to the module associated with the second stage based on the signal sent to the module associated with the second stage.

9. The method of claim 1, wherein the signal sent to the first module is a first signal sent to the first module, the method further comprising:
sending a second signal to the first module associated with the stage of the switch fabric to instruct the first module to enter a loop-back mode prior to sending the first signal to the first module.

10. The method of claim 1, wherein the sending the signal to the first module includes sending the signal to the first module via a cable, the method further comprising:
determining a length of the cable based on an amount of time between the sending the signal to the first module and the receiving the signal from the first module, a processing time within the first module between the sending the signal to the first module and the receiving the signal from the first module being subtracted from the amount of time prior to determining the length of the cable.

11. The method of claim 1, wherein the sending the signal to the first module is automatically initiated in response to a connection being made with the first module.

12. A method, comprising:
receiving a first signal from a first module associated with a stage of a switch fabric;
sending a second signal to the first module;
receiving a third signal from a second module associated with the stage of the switch fabric;
sending a fourth signal to the second module, an amount of time between the second module sending the third signal and the second module receiving the fourth signal being less than an amount of time between the first module sending the first signal and the first module receiving the second signal;
receiving a first cell of a data packet from the first module at a first time; and
receiving a second cell of the data packet from the second module at a second time subsequent the first time such that an amount of time between the first cell being received by the switch fabric and the second cell being received by the switch fabric is substantially equal to an amount of time between the first time and the second time.

13. The method of claim 12, further comprising:
receiving a third cell of the data packet from a third module associated with the stage of the switch fabric at a third time subsequent the second time such that an amount of time between the second cell being received by the switch fabric and the third cell being received by the switch fabric is substantially equal to an amount of time between the second time and the third time.

14. The method of claim 12, wherein an amount of time between receiving the first signal and sending the second signal is substantially equal to an amount of time between receiving the third signal and sending the fourth signal.

15. The method of claim 12, further comprising:
sending the first cell of the data packet to an access switch at a third time;
sending the second cell of the data packet to the access switch at a fourth time subsequent the third time.

16. The method of claim 12, further comprising:
receiving a third cell of the data packet from the first module associated with the stage of the switch fabric at a third time subsequent the second time such that an amount of time between the second cell being received by the switch fabric and the third cell being received by the switch fabric is substantially equal to an amount of time between the second time and the third time.

17. A method, comprising:
sending a first plurality of signals to a module associated with a stage of a switch fabric, the first plurality of signals having a number of signals;
receiving a second plurality of signals from the module within a predetermined time period, each signal from the second plurality of signals being received in response to a signal based on the first plurality of signals, the second plurality of signals having a number of signals;

determining a length of a cable coupled to the module based on the number of signals from the first plurality of signals and the number of signals from the second plurality of signals; and sending to the module a control signal configured to cause the module to enter a loop-back mode prior to the sending the first plurality of signals to the module.

18. The method of claim 17, wherein a processing time between the sending the first plurality of signals and the receiving the second plurality signals is substantially constant.

19. The method of claim 17, wherein the module is a first module associated with the stage of the switch fabric, the method further comprising:

sending a third plurality of signals to a second module associated with the stage of the switch fabric, the third plurality of signals having a number of signals;

receiving a fourth plurality of signals sent from the second module within a predetermined time period, each signal from the fourth plurality of signals being received in response to a signal based on the first plurality of signals, the fourth plurality of signals having a number of signals; and determining a length of a cable coupled to the second module based on the number of signals from the third plurality of signals and the number of signals from the fourth plurality of signals.

20. The method of claim 17, wherein the module associated with the stage of the switch fabric is a first module associated with the stage of the switch fabric, the method further comprising:

determining a length of a cable coupled to a second module associated with the stage of the switch fabric, the length of the cable coupled to the second module being greater than the length of the cable coupled to the first module; and delaying sending a cell of a data packet to the first module associated with the stage of the switch fabric an amount of time associated with a difference in the length of the cable coupled to the second module and the length of the cable coupled to the first module.

* * * * *